3,598,559
GLASS MOLDING APPARATUS WITH COOLING
VALVE ACTUATING APPARATUS
Richard H. M. Johnston, and Joseph R. Jones, Corning,
N.Y., assignors to Corning Glass Works, Corning, N.Y.
Filed Dec. 1, 1969, Ser. No. 881,232
Int. Cl. C03b 9/38
U.S. Cl. 65—161                4 Claims

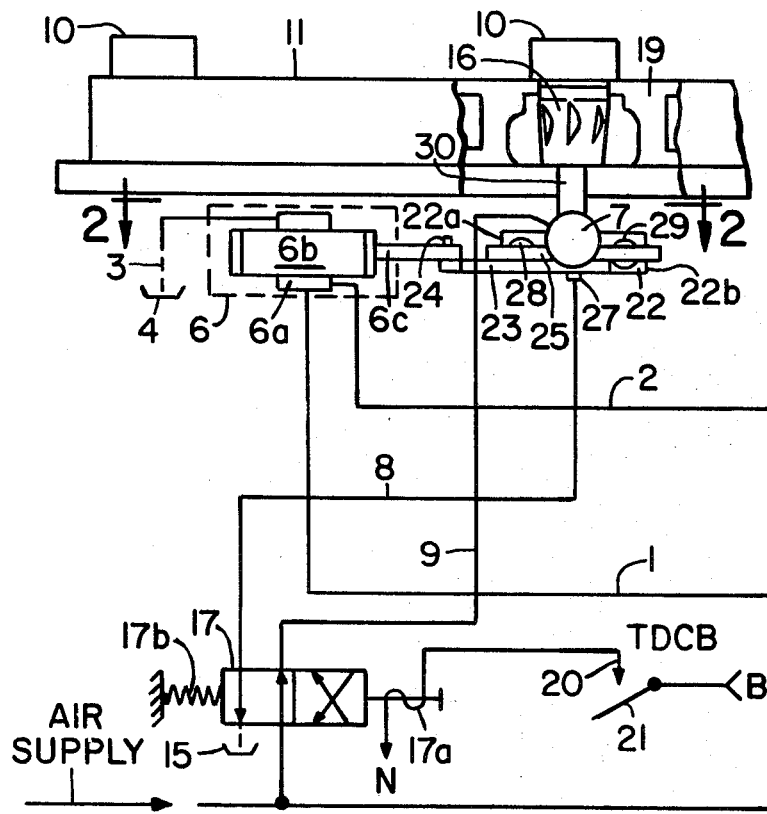
Fig. 1
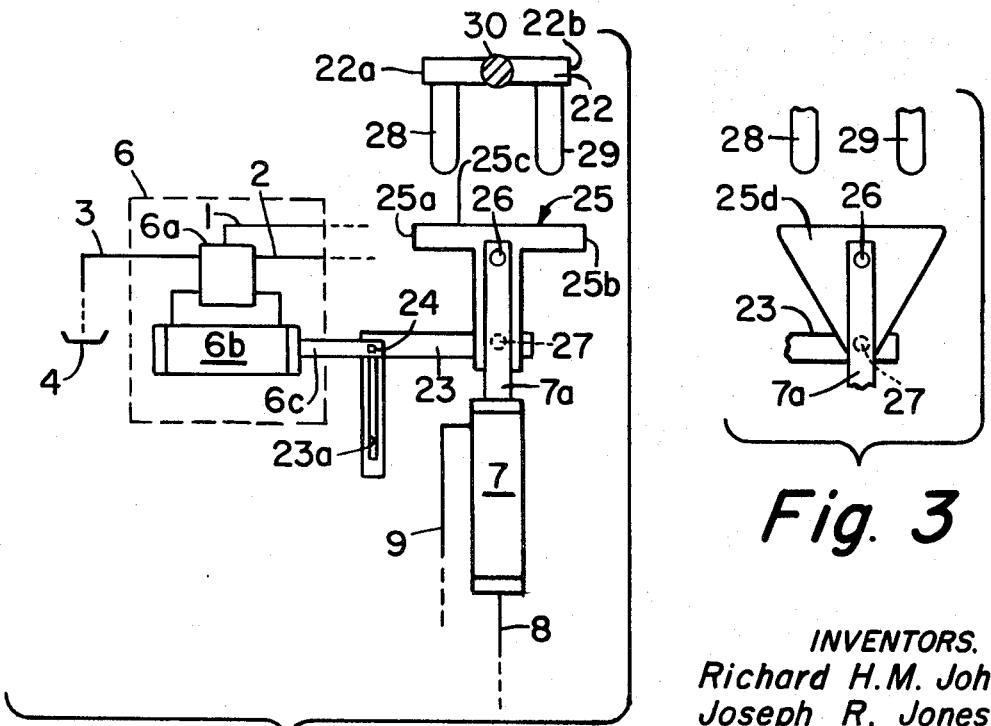
Fig. 2
Fig. 3
INVENTORS.
Richard H.M. Johnston
Joseph R. Jones
BY Charles W. Gregg
AGENT United States Patent Office 3,598,559
Patented Aug. 10, 1971

ABSTRACT OF THE DISCLOSURE

Apparatus for adjusting cooling fluid control valves to control the temperature of each of a plurality of molds to within a desired temperature range therefor, each such mold being intermittently positioned at a station where such a cooling fluid control valve associated with the respective mold is adjusted in accordance with a temperature adjustment signal representing adjustment necessary in the respective valve to bring the temperature of the respectively associated mold to the desired temperature for such mold.

BACKGROUND OF THE INVENTION

There is disclosed in Letters Patent of the United States, 3,071,967, issued Jan. 8, 1963, to R. J. Mouly, a temperature measuring system useful in measuring and controlling the temperature of moulds in which articles are formed from a heated or molten material. FIG. 12 of such patent illustrates automatic control for adjusting the temperature of each of a plurality of molds, such as those mentioned, in accordance with the measured or sensed temperature of one of said plurality of molds. The description of the operation of the control illustrated in said FIG. 12 is covered in lines 17 through 49 of column 17 of said patent.

It has recently been recognized that the temperature of each of a plurality of molds being used to form similar articles from a heated or molten material should not necessarily be the same temperature as any of the other molds of such plurality in order to produce ware or articles having similar characteristics such as shape and dimensions. Furthermore, each said mold may have cooling characteristics differing from those of the other molds of the plurality thereof and, therefore, require a different amount of cooling fluid to be supplied thereto in order to maintain it within its optimum temperature range for the ware or articles to be formed. It is, therefore, readily apparent that automatically controlling the supply of cooling fluid to all of a plurality of molds in accordance with the sensing of the temperature of one mold of such plurality does not provide a type of automatic control system that is the most desirable possible. Accordingly, an automatic control system for controlling the temperature of each of a plurality of molds in accordance with the article-forming and cooling characteristics of each respective mold and the sensed temperature of each such mold following each forming operation performed thereby was developed. Such control system is disclosed in co-pending patent application Ser. No. 778,280, filed Nov. 22, 1968 by Raymond J. Mouly and Robert L. Thomas, such application being assigned to the same assignee as the present application.

In the control system of said co-pending application there is provided at a mold cooling station an adjustable cooling fluid control valve for supplying cooling fluid to each mold positioned at such station. Such valve is adjusted for each mold arriving at the cooling station and cooling fluid is supplied to the molds only at such station. It is believed obvious that it is more expedient to provide a cooling air control valve for each said mold and for such valves to be carried on the machine which carries such molds. By such an arrangement cooling air can be supplied to said molds continuously or during any selected period or periods in the movement of said molds from station to station by said machine. Valves such as disclosed in patent application, Ser. No. 672,098, filed Oct. 2, 1967 by Daniel R. Ayers and Darrell E. Chapin, and assigned to the same assignee as the present application, are intended for such purpose. Such application is now abandoned but is referred to in copending patent application, Ser. No. 832,365, filed June 11, 1969 by Daniel R. Ayers and assigned to the same assignee as the present application.

In employing fluid flow control valves such as disclosed in said abandoned application of Messrs. Ayers and Chapin, it is expedient, for obvious economical reasons, to provide only a single set of apparatus for controlling or adjusting all of said valves, such set of apparatus being located at a selected location along the path of movement of said molds and their respectively associated valves, and each such valve being selectively adjusted while it and its associated mold dwell at such location. However, for such purpose it is necessary, of course, that said valve control or adjustment apparatus not be permanently connected with the machine which carries said valves and their associated molds. Accordingly, it is the object of the present invention to provide apparatus located at a selected station or position along the path of movement of said molds and valves, such apparatus being operative to selectively adjust each said valve while it dwells at said selected station or position, and thereby, to selectively control the temperature of each said mold by varying the amount of cooling air supplied thereto.

SUMMARY OF THE INVENTION

In acomplishing the above object of the invention, there is provided a pressurized fluid actuated actuator including a fluid cylinder whose piston rod is normally maintained in a substantially midway or neutral position within such cylinder and which is actuable to extend or retract said piston rod different distances corresponding to different values of pressurized fluid signals supplied to the actuator. A second pressurized fluid cylinder and associated piston rod are also provided, such piston rod being normally maintained in a retracted position within its associated cylinder. Said cylinders and their associated piston rods are located at a selected station along the path of movement of forming molds and their associated cooling air control valves, and such piston rods are actuable through selected paths of travel to actuate apparatus which contacts first and second actuating rods on first and second ends, respectively, of valve actuating cross members of said valves and, thereby, rotatively adjust each such valve to supply a selected amount of cooling air to the respectively associated mold.

BRIEF DESCRIPTION OF THE DRAWINGS

In the drawings:

FIG. 1 is a partly elevational and partly diagrammatic view of one form of apparatus embodying the invention;

FIG. 2 is a view of the apparatus of FIG. 1 and is taken generally along line 2—2 of FIG. 1; and FIG. 3 is a view taken similarly to FIG. 2 and illustrates a modification of the apparatus disclosed.

Similar reference characters refer to similar parts in each of the figures of the drawings.

PREFERRED EMBODIMENTS OF
THE INVENTION

Referring to the drawings in detail, there is shown in FIG. 1 an indexing or intermittently positioned press table or turret 11 which carries a plurality of molds such as 10 which are successively and intermittently moved or indexed through a plurality of stations or positions including a mold charging station, a forming station, an article take-out station, and a mold cooling control valve adjustment station. Table 11 may, for example, be the rotating table of a turret type glass-forming machine.

A rotatably adjustable cooling fluid control valve such as 16 is provided below each mold such as 10 and controls a suitable supply of cooling fluid, such as compressed air for example, to each respectively associated mold. However, for purposes of simplification of the drawings, only one valve such as 16 is shown therein. The valves such as 16 may, for example, be similar to the fluid flow control valve disclosed in the aforecited abandoned patent application of Messrs. Ayers and Chapin, and each such valve includes a cross member such as 22 which is affixed to the lower end of a member 30 by which the respective valve can be selectively rotatably adjusted to vary the amount of cooling fluid or air supplied to the respectively associated mold. The cross-member such as 22 and member 30 correspond, respectively, to cross-member 46 and portion 29 of member 27 shown in FIGS. 2, 3 and 4 of said patent application of Messrs. Ayers and Chapin. However, first ends of a pair of actuating members or rods 28 and 29 are affixed to member 22 adjacent ends 22a and 22b, respectively, of such member as shown in FIG. 2.

Referring further to FIG. 1, taken in conjunction with FIG. 2, there is shown a valve actuator 6 including a positioner 6a, and a pressurized fluid cylinder and associated piston rod 6b and 6c, respectively. The end of piston rod 6c is provided with a square or rectangular stud 24 the lower end of which extends into a longitudinal slot 23a in an L-shaped member 23 whose purpose will become apparent as the description proceeds. There is also affixed to piston rod 6c a laterally extending member or arm 6d to which is attached one end of a partially expanded expansion coil spring 6e. The other end of spring 6e is shown attached to positioner 6a so that the spring is further expanded when piston rod 6c is further actuated out of its associated cylinder 6b. Actuators such as 6 are well known and such actuator may, for example, be a Type 480 Air Cylinder Valve Actuator which includes an integrally mounted positioner such as 6a and which is sold by Fisher Governor Company, Marshalltown, Iowa 50158. The piston rod such as 6c of actuator 6 is normally maintained in a substantially midway or neutral position within cylinder 6b and, upon the supplying of a pressurized fluid signal to the actuator as hereinafter discussed, piston rod 6c is reacted further into or actuated further out of the cylinder a distance corresponding to the value of such presusrized fluid signal. Upon the termination of the fluid signal, piston rod 6c is again actuated within cylinder 6b to its generally midway position.

A second pressurized fluid cylinder 7 and associated piston rod 7a is also provided and the end of such piston rod is pivotally connected, as by a suitable bolt pin or shaft 26 to a tiltable member shown in FIG. 2 as a T-shaped member 25 whose purpose will also become apparent as the description proceeds. The lower end of the upright portion of T-shaped member 25 (viewing FIG. 2) is pivotally connected or coupled, as by a suitable bolt pin or shaft 27, to one end of previously mentioned L-shaped member 23 as illustrated in FIGS. 1 and 2. The longitudinal surface or face 25c of the crossbar of member 25 faces the cross-members such as 22 normally in substantially parallel alignment with each such cross-member of each respective valve positioned at the station illustrated in FIG. 1, and said upright portion of member 25 normally extends in substantially parallel alignment with piston rod 7a of cylinder 7. The free end of piston rod 7a is actuable through a path of travel which extends generally perpendicular or normal to each said cross-member such as 22 position at the station illustrated in FIG. 1. The free end of piston rod 6c of cylinder 6b is actuable through a path of travel which extends generally normal or perpendicular to said path of travel of piston rod 7a of cylinder 7.

There is also shown in FIG. 1 a solenoid actuated fluid flow control valve 17 including a solenoid winding 17a and a compressible coil spring 17b which will be discussed further hereinafter. An electro-pneumatic transducer 5 is also provided. Transducers such as 5 are well known in the art and such transducer may, for example, be a Type 545 Electro-Pneumatic Transducer which is also sold by the previously mentioned Fisher Governor Company. Transducer 5 is connected to a supply of pressurized fluid, such as compressed air for example, and such transducer produces pneumatic output signals having values corresponding or proportionate to the values of electrical input or adjustment signals supplied to the transducer, as hereinafter further discussed.

The previously mentioned fluid flow control valve 17 is connected to a suitable source or supply of pressurized fluid such as compressed air and such fluid normally flows through the valve and through a suitable fluid conduit 9 to one end of pressurized fluid cylinder 7 (FIGS. 1 and 2) to maintain piston rod 7a normally retracted within the cylinder. At such time the other end of cylinder 7 is connected through a suitable fluid conduit 8 and valve 17 to atmosphere or to a suitable fluid sink 15. When the solenoid winding 17a of valve 17 is energized, as hereinafter discussed, valve 17 is actuated to reverse the connections from the valve to conduits 8 and 9. At such time said other end of cylinder 7 is connected to the pressurized fluid supply while the end of such cylinder previously connected to said supply is connected through valve 17 to fluid sink 15 or to atmosphere. Piston rod 7a is, thereby, actuated to its extended condition at such time. Upon subsequent deenergization of solenoid winding 17a, coil spring 17b of valve 17 reactuates such valve to its normal position shown in FIG. 1, and rod 7a is, thereby, returned to its normal retracted position within cylinder 7. This will be further discussed hereinafter in an operational example of the invention.

There is further shown in FIG. 1, electrical circuit controlling contacts TDCA and TDCB which may, for example, be contacts on the conventional timing drum used for controlling the indexing of press table or turret 11. Contact TDCA includes a movable contact member 12 which is actuated by said timing drum from against a first fixed contact point 13 and against a second fixed contact point 13a shortly following the indexing of each mold such as 10 to the cooling valve adjustment station shown in FIG. 1. Contact member 12 is also reactuated by said timing drum to its position shown in FIG. 1 immediately prior to the departure of each said mold from said adjustment station. Contact TDCA normally supplies over fixed contact point 13 thereof a neutralizing or normalizing electrical signal to transducer 5 which is a signal which actuates the transducer to supply to actuator 6a a pneumatic signal having a value that causes piston rod 6c to occupy said substantially midway position in cylinder 6b. Contact TDCA, as hereinafter discussed, also supplies over contact point 13a thereof, an electrical adjustment signal to electro-pneumatic transducer 5 for each said mold, such as 10, which is moved to the adjustment station. Each such adjustment signal has a value representative of adjustment necessary in the valve such as 16 to adjust the supply of cooling air supplied to the mold such as 10 to bring the temperature of such mold to a desired preset temperature therefor. The apparatus or system for producing such adjustment signals forms no part of the present invention but such signals may, for example, be supplied to transducer 5 from a temperature recorder such as 26 as illustrated in FIG. 9 or 12 of the aforecited Mouly patent, or said signals may be supplied to transducer 5 from a digital computer such as 19 as shown in the aforecited co-pending application of Messrs. Mouly and Thomas. As previously mentioned transducer 5 produces a pneumatic output or adjustment signal corresponding in value to or representative of the value of each electrical adustment signal supplied to the transducer over said contact point 13a of contact TDCA. Such pneumatic adjustment signals are supplied over a suitable fluid conduit 2 to positioner 6a of actuator 6. Such positioner is also connected over a suitable fluid conduit 3 to atmosphere or a suitable fluid sink 4.

Previously mentioned timing drum contact TDCB (FIG. 1) includes a movable contact member 21 which is actuated by the previously mentioned timing drum against a fixed contact point 20 a brief period following the closure of contact members 12–13a of timing drum contact TDCA. Contact TDCB is also reactuated to a circuit interrupting condition a brief period prior to the opening of members 12–13a of contact TDCA. The purpose of such timing of the actuations of contact TDCB will become apparent hereinafter. As shown in FIG. 1 movable contact member 21 of contact TDCB is connected to a positive terminal B of a source of direct electrical current suitable for energization of solenoid winding 17a of valve 17 and, therefore, upon the closing of such contact member against fixed contact point 20 of contact TDCB, a circuit to said solenoid winding is closed. Such circuit extends from said terminal B over contact members 20–21 of contact TDCB and thence through said solenoid winding 17a to negative terminal N of said current source. For purposes of simplification of the drawings said source of electrical current is not shown therein but, as mentioned, its positive and negative terminals are designated B and N, respectively.

The apparatus of FIGS. 1 and 2 of the invention having thus been discussed in detail, a brief operational example of the invention will be given.

It will first be assumed that the cooling air control valve 16, associated with the mold 10 and shown in FIG. 1 as having been moved by table or turret 11 to the cooling air control valve adjustment station, and that said mold 10 has been found to be too cool. Under such conditions an electrical control or adjustment signal, having a value corresponding or proportionate to, or representative of, adustment required in said valve 16 to reduce the amount of cooling air supplied to mold 10, is supplied to fixed contact member 13a of timing drum contact TDCA. Upon closing of movable contact member 12 against fixed contact point 13a of contact TDCA, said electrical adjustment signal is supplied to transducer 5 and such transducer produces a pneumatic adustment signal having a value corresponding or proportionate to, or representative of, the value of said electrical adjustment signal. Such pneumatic signal thus produced is supplied over conduit 2 to positioner 6a of actuator 6. Positioner 6a, which is also connected over a suitable fluid conduit 1 to a suitable source of pressurized fluid such as compressed air, is operated by said pneumatic signal to supply pressurized fluid to cylinder 6b of actuator 6 and piston rod 6c is, thereby, actuated or extended out of cylinder 6b a distance proportionate or corresponding to the value of said pneumatic adjustment signal. At such time piston rod 6c actuates L-shaped member 23 in the right hand direction (viewing FIG. 2) and T-shaped member 25 is, thereby, pivoted about its pivot pin or bolt 26 to cause such member to tilt or slant and, thereby, cause end 25b of member 25 to be moved in a direction towards the second end of actuating rod or member 29 whose first end is affixed to cross-member 22 adacent end 22b thereof as previously mentioned.

Following the above-described actuations, timing drum contact TDCB closes (FIG. 1) and solenoid winding 17a of valve 17 is energized to reverse the connections to conduits 8 and 9 connected to cylinder 7. Pressurized fluid or compressed air then flows through conduit 8 to cylinder 7 to extend or actuate piston rod 7a of such cylinder in a direction toward cross-member 22 and its associated actuating rods or members 28 and 29 to cause end 25b of T-shaped member 25 to contact the second end or rod or member 29 and push such rod to actuate cross-member 22 to rotatably actuate valve 16 to a partially closed condition and, thereby, reduce the amount of cooling air supplied through such valve to mold 10.

Subsequent to the above-described actuations of the apparatus, contact TDCB again opens and solenoid winding 17a of valve 17 is de-energized (FIG. 1). Spring 17b then reactuates valve 17 to its normal position and the connections to conduits 8 and 9 are again reversed, that is, are reactuated to their normal condition shown in FIG. 1. Piston rod 7a is, thereby, reactuated to its retracted position within cylinder 7. Following such reactuation of piston rod 7a of cylinder 7, movable member 12 of contact TDCA of the aforementioned timing drum moves from fixed contact point 13a of contact TDCA and closes against fixed contact point 13 of such contact. The electrical adjustment signal to transducer 5 is then interrupted and the electrical neutralizing signal is supplied to transducer 5. This, in turn, interrupts the pneumatic adjustment signal co positioner 6a of actuator 6 and causes to be supplied to such positioner a pneumatic neutralizing signal to cause piston rod 6c to return to its normal midway position within cylinder 6b of actuator 6. Another mold such as 10 and its associated valve such as 16 can now be indexed by table or turret 11 to the valve adjustment station for the adjustment of such valve associated with such other mold.

It will now be assumed that, upon the completion of a complete revolution of table or turret 11 so that the mold 10 and its associated valve 16 shown in FIG. 1 are again positioned at the valve adjustment station, such mold 10 is too hot and, therefore, that the adjustment signal supplied to the apparatus is of a value such as to cause actuation of valve 16 to open further and increase the amount of cooling air to mold 10. Such adjustment signal is supplied to fixed contact point 13a of timing drum contact TDCA and, upon closing of movable contact 12 against such contact point, said electrical adjustment signal is supplied to transducer 5 and such transducer then produces a pneumatic adjustment signal having a value corresponding, or proportionate to, or representative of, the value of said electrical adjustment signal. Such pneumatic signal thus produced is supplied over conduit 2 to positioner 6a of actuator 6 and positioner 6a is operated by the pneumatic signal to supply pressurized fluid to cylinder 6b of actuator 6 and cause piston rod 6c to, thereby, be actuated or further retracted into cylinder 6b a distance proportionate or corresponding to the value of said pneumatic adjustment signal. When piston rod 6c is actuated as discussed above, it actuates L-shaped member 23 in the left hand direction (viewing FIG. 2) and T-shaped member 25 is, thereby, pivoted about its pivot pin or bolt 26 to cause such member to tilt or slant and, thereby, cause end 25a of member 25 to be moved in a direction towards the second end of actuating rod or member 28 whose first end is affixed to cross-member 22 adjacent end 22a thereof as previously mentioned.

Subsequent to the above actuations, timing drum contact TDCB closes (FIG. 1) and solenoid winding 17a of valve 17 is energized to reverse the connections to conduits 8 and 9 connected to cylinder 7. Pressurized fluid or compressed air then flows through conduit 8 to cylinder 7 to extend or actuate piston rod 7a of such cylinder in a direction toward cross-member 22 and its actuating rods or members 28 and 29 to cause end 25a of T-shaped member 25 to contact the second end of rod or member 28 and push such rod to actuate cross-member 22 to rotatably actuate valve 16 to a further open condition and, thereby increase the amount of cooling air supplied through such valve to mold 10.

Following the above-described actuation of the apparatus, contact TDCB again opens and solenoid winding 17a of valve 17 is de-energized (FIG. 1). Spring 17b then reactuates valve 17 to its normal position and the connections to conduits 8 and 9 are again reversed, that is, are reactuated to their normal condition shown in FIG. 1. Piston rod 7a is, thereby, reactuated to its retracted position within cylinder 7. Following such reactuation of piston rod 7a, movable contact member 12 of contact TDCA moves from against fixed contact point 13a of contact TDCA and closes against fixed contact point 13 of such contact. The electrical adjustment signal to transducer 5 is, thereby, interrupted and the electrical neutralizing is supplied to transducer 5. This, in turn, interrupts the pneumatic adjustment signal to positioner 6a of actuator 6 and causes to be supplied to such positioner a pneumatic neutralizing signal to cause piston rod 6c to return to its normal midway position within cylinder 6b of actuator 6. Another mold such as 10 and its associated valve such as 16 can now be indexed by table or turret 11 to the value adjustment station for the adjustment of such valve associated with such other mold.

It is pointed out that, when piston rod 7a is actuated or extended out of its associated cylinder 7 and is subsequently reactuated to its retracted position therein to move T-shaped member 25 towards and away from cross-member 22 as previously discussed, member 25 carries L-shaped member 23 along with it in corresponding directions because member 23 is connected to member 25 by pivot pin or shaft 27. No. pivotal movementof member 23 about pivot pin or shaft 27 can occur at such time because the square or rectangular stud 24 provided on piston rod 24 extends into slot 23a in member 23, in relatively snug but slidable relationship therein and, thereby, prevents such pivotal movement. Therefore, at the time of said movements of member 25 towards and away from cross-member 22 and said corresponding movements of member 23, stud 24 slides along slot 23a, that is to say, the sides of slot 23a slide along the sides of stud 24 during such movements of member 23.

In the modification of FIG. 3, a three-point tiltable member 25d is shown as having the shape of an isoceles or equilateral triangle and is substituted for the T-shaped member 25 of FIGS. 1 and 2. However, it will be readily apparent that in such modification the apparatus operates in a manner identical to that described for the embodiment of the invention shown in FIGS. 1 and 2, and no detailed operational description of the modification of FIG. 3 is considered necessary.

It is pointed out that members having other shapes can obviously be substituted for member 25 or 25d and the apparatus of the invention made to operate in a manner identical to that described in conjunction with FIGS. 1 and 2 of the drawings. Furthermore, member 23 need not be an L-shaped member as shown in FIG. 2 but such member may have other planar configurations such as that of a right triangle or of a generally square or rectangular plate. This will be readily obvious to those skilled in the art.

It is also pointed out that the rods or members such as 28 and 29 could be provided on member 25 adjacent ends 25a and 25b thereof in an attitude in which they extend towards cross-member 22 rather than being provided on cross-member 22 as shown in FIGS. 2 and 3 of the drawings.

In the light of the above discussion it will be readily apparent that each valve, such as 16, which is indexed to the valve adjustment station will be adjusted, in a manner similar to that just described, to supply a greater or lesser amount of cooling air to the respectively associated mold such as 10, each such adjustment being proportional to or corresponding to an adjustment signal supplied to the apparatus and representative of adjustment required in the respective valve to bring the temperature of its associated mold to a desired temperature therefor.

What is claimed is:
1. In an apparatus comprising,
(A) a machine for forming articles from a molten material and including an intermittently indexed table or turret which intermittently positions each of a plurality of forming molds at each of a plurality of stations, with means to supply cooling fluid to each mold and
(B) a rotatable cooling fluid control valve carried on said machine below each said mold, each such valve including a cross-member for rotative adjustment of the respective valve, such cross-members being disposed below said table; additional apparatus for actuating said cross-members in accordance with the value of pressurized fluid temperature adjustment signals for said molds, such additional apparatus comprising;
  (a) a first pressurized fluid cylinder with a fluid actuated piston rod normally actuated to a retracted position within the cylinder, such cylinder located at a selected one of said plurality of stations with the free end of its piston rod actuable through a path of travel perpendicularly to said cross-member of each said valve positioned at said selected station;
  (b) an actuator selectively responsive to pressurized fluid signals and including a second pressurized fluid cylinder with a fluid actuated piston rod normally in a substantially midway position within the cyinder, such actuator located at said selected one of said plurality of stations with the free end of its piston rod actuable through a path of travel extending generally normal to said path of travel of said piston rod of said first cylinder,
  (c) first means actuated following the arrival of each said valve at said selected station, to supply a pressurized fluid temperature adjustment signal, associated with the respective valve, to said actuator and to interrupt such signal prior to the departure of such valve from said station;
  (d) second means actuated to supply pressurized fluid to said first cylinder to actuate the piston rod of such cylinder to move said free end thereof through its said path of travel and to reactuate such piston rod to its retracted position within the first cylinder all in the time period between the supply and interruption of said adjustable signal to said actuator;
  (e) a tiltable member including a longitudinal surface thereon facing and normally in substantially parallel alignment with said cross-member of each said valve when the respective valve is positioned at said selected one of said plurality of stations and said first means is unactuated, said member also including a portion normally extending in a direction away from said longitudinal surface and towards said first cylinder in substantially parallel alignment with said piston rod of such cylinder, said portion of said member being pivotally coupled to said piston rod adjacent said free end of such rod and at a point on the end of said portion remote from said first cylinder and substantially equidistant from the ends of said member defining the ends of said longitudinal surface;
  (f) a non-tiltable member having a first end pivotally coupled adjacent such end to said portion of said tiltable member adjacent the end of such portion nearest said first cylinder, such member extending in a direction away from such first cylinder to said free end of said piston rod of said second cylinder; and
  (g) means coupling said free end of said piston rod of said second cylinder with said non-tilt- able member, such coupling means permitting relative movement between such piston rod and such member only in linear directions extending generally normal to said path of travel of the piston rod of the second cylinder.

2. Apparatus in accordance with claim 1 and in which said supplying of said signals and pressurized fluid to said cylinders is controlled by electrical contacts actuated in a time relationship with the movement of said intermittently indexed table.

3. Apparatus in accordance with claim 1 and in which said tiltable member is a T-shaped member, said longitudinal surface thereon is the face of the cross-bar of such member, said non-tiltable member is an L-shaped member, and said coupling means comprise a longitudinal slot in said L-shaped member and a rectangular stud adjacent the end of said piston rod of said second cylinder and extending into said slot in a snug and slidable relationship therewith.

4. Apparatus in accordance with claim 2 and in which said tiltable member is a T-shaped member, said longitudinal surface thereon is the face of the cross-bar of such member, said non-tiltable member is an L-shaped member, and said coupling means comprise a longitudinal slot in said L-shaped member and a rectangular stud adjacent the end of said piston rod of said second cylinder and extending into said slot in a snug and slidable relationship therewith.

References Cited

UNITED STATES PATENTS

| | | | |
|---|---|---|---|
| 2,751,715 | 6/1956 | Denman | 65—319X |
| 3,071,967 | 1/1963 | Mouly | 65—162 |
| 1,961,894 | 6/1934 | Wadman et al. | 65—162 |
| 3,332,765 | 7/1967 | Champlin | 65—162 |
| 3,372,017 | 3/1968 | Pitbladdo | 65—162 |
| 3,407,055 | 10/1968 | Argyle et al. | 65—161 |

ARTHUR D. KELLOGG, Primary Examiner

U.S. Cl. X.R.

65—162, 319